Oct. 18, 1932.   G. L. ROCK   1,882,925
METHOD OF SEALING MATERIALS
Filed Oct. 3, 1927
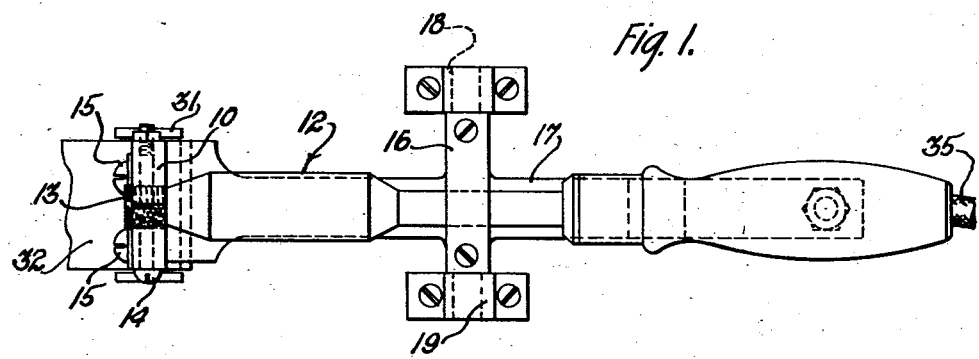
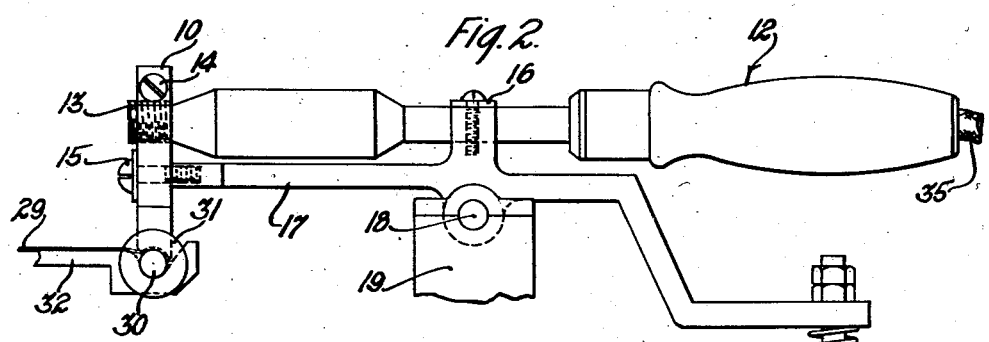
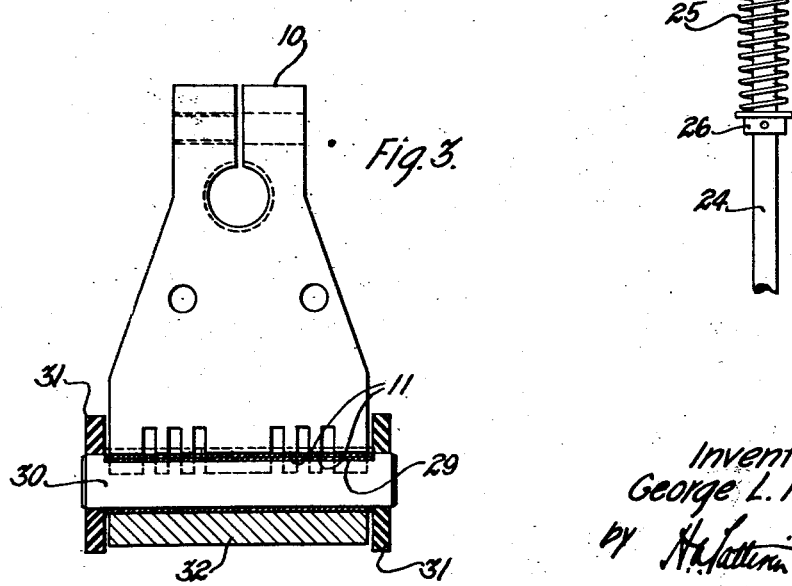
Inventor
George L. Rock
by H. Mattern Att'y Patented Oct. 18, 1932

1,882,925

UNITED STATES PATENT OFFICE

GEORGE LYNDEN ROCK, OF CICERO, ILLINOIS, ASSIGNOR TO WESTERN ELECTRIC COMPANY, INCORPORATED, OF NEW YORK, N. Y., A CORPORATION OF NEW YORK

METHOD OF SEALING MATERIALS

Application filed October 3, 1927. Serial No. 223,573.

This invention relates to a method of sealing materials, and more particularly to the method of sealing waxed insulating materials on cores.

In the art of sealing materials, such as waxed protective coverings and the like, it has been the practice in certain instances to render the wax liquid across the entire surface to be sealed and upon the removal of the heat to apply pressure for a period of time to retain the material in contact position until the hot liquid wax becomes cold and adherent.

The principal objects of the invention are the provision of a simple method of quickly and economically sealing materials.

In accordance with one embodiment the invention contemplates the provision of a method for sealing waxed material upon cores such as, for example, the waxed insulating material usually applied to certain types of spool cores for electromagnetic apparatus used in telephone equipment. The insulating material in the form of sheets of waxed paper, cloth, or the like, is wrapped around and sealed to the metallic spool cores to prevent contact between the cores and electrical conductors subsequently wound thereon. In practicing the invention the waxed material is heated at spaced intervals along the core thereby to render portions thereof liquid and the remaining portions plastic and still adhesive through the conveyance of heat from the heated portions by the material adjacent thereto and by convection whereby an instantaneous sealing is effected.

Other features and advantages of the invention will become apparent from the following detailed description, reference being had to the accompanying drawing disclosing one form of apparatus whereby the method may be practiced, wherein Fig. 1 is a fragmentary plan view of a sealing apparatus by means of which the improved method may be produced.

Fig. 2 is a fragmentary side elevational view thereof, and

Fig. 3 is an enlarged detailed front view of the serrated sealing member shown in association with a spool upon which a sheet of insulating waxed material has been wound and which is shown in section.

Referring now to the drawing wherein like numerals are employed to designate similar parts throughout the several views, the numeral 10 indicates a sealing member having a serrated or toothed surface 11. This sealing member is attached to an electrical heating iron 12 of any suitable type by means of a screw 13 and a clamping bolt 14. The heating iron and sealing member are fastened by screws 15 and a clamping strip 16 to a supporting plate 17, which in turn is supported on a pivot 18 in a bearing 19 suitably attached to a bench.

The pivoted plate 17 is adapted to receive an actuator rod 24 which carries a spiral spring 25 resting on a collar 26. The rod 24 may be fastened to a foot treadle (not shown) so that when the treadle is operated the rod 24 is forced upwardly causing the spring 25 to be raised against the underside of the plate 17. The pressure of the spring 25 swings the heating iron until the serrated or indented surface of the sealing member 10 comes into contact with a sheet of insulating material 29 previously positioned on a core 30 of a spool 31 (Fig. 2) which may be rotated by conventional means (not shown) upon a table 32. Electrical energy for heating the sealing member 10 may be supplied to the iron 12 through conductors 35 connected to a source of supply (not shown).

The operation of the above described mechanism is as follows: A spool 31, on the core of which it is desired to fasten a sheet of the waxed insulating material 29, is placed upon the table 32. The operator places the forward end of the strip of waxed insulating material 29 upon the core 30 of the spool (Fig. 2) and then causes the rod 24 to move upwardly. This upward movement of the rod compresses the spring 25 against the plate 17 and rocks the iron 12 forward bringing the hot serrated sealing member into contact for an instant with the insulating material 29, thereby causing an adherence between the insulating material and the core of the spool. The spool is then rotated by any suitable means (not shown) to wind the insulating material around the spool core and the free end is sealed by again bringing the sealing member in contact with the insulating material as shown in Fig. 3. Thus the core is quickly provided with an insulated covering which is effectively used to avoid electrical contact between the core and magnetizing windings subsequently wound thereon.

The improved method of using a serrated or slotted sealing member permits of a very rapid sealing of waxed materials. The engagement of the slotted heated sealing member with the waxed material renders the wax fluid over the localized areas of contact but only plastic and adhesive within the spaces between the contacting areas. The wax within the spaces is rendered adhesive as a result of the heat which may be transmitted through the surrounding air by convection and through the material by conduction. The immediate adherence of the waxed material thus rendered adhesive eliminates the necessity of holding the material in place for a period of time until the hot liquid wax becomes cold and adherent.

Although the construction of the slotted sealing member and control mechanism illustrated in the drawing and hereinbefore described may be used to advantage in connection with the present embodiment of the invention, it should be understood that the invention is not to be limited to the particular construction shown, except as defined by the appended claims.

What is claimed is:

1. The method of sealing a layer of fabric combined with a fusible adhesive material to an article, which consists in applying heat to the fabric at spaced intervals to render certain portions of the fusible adhesive material therein liquid and other adjacent portions adhesive.

2. The method of sealing a member containing fusible material to an article, which consists in applying heat at predetermined spaced intervals upon the member to render the fusible material plastic and adhesive adjacent the areas of heat application and to effect an instantaneous sealing of the material.

3. Method of sealing waxed material, which consists in overlapping portions of the material, converting the wax of the overlapped portions into localized areas of plastic and adherent wax adjacent areas of liquid wax and then hardening the wax in all of the areas.

4. The method of sealing a layer of fabric combined with a fusible adhesive material to an article, which consists in applying heat to the fabric at spaced intervals so as to render adhesive the fusible adhesive material therein between the positions of application.

5. The method of sealing together a plurality of sheets of waxed fabric, which comprises applying heat thereto at spaced areas thereby rendering adhesive the wax between the spaced areas.

6. The method of sealing together a plurality of layers of fabric combined with a fusible material, which comprises applying heat thereto at spaced points thereby fusing the adhesive material at said points and rendering adhesive the material between said points.

In witness whereof, I hereunto subscribe my name this 24th day of September A. D., 1927.

GEORGE LYNDEN ROCK.